Figure 1:
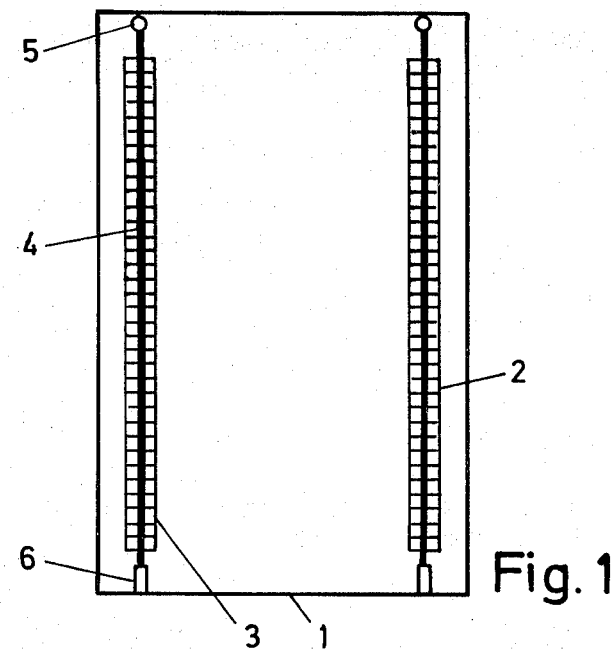

United States Patent [19]
Davies

[11] 3,865,712
[45] Feb. 11, 1975

[54] ELECTRODE ARRANGEMENT FOR AN ELECTROPHORETICAL SEPARATION PERFORMED IN A GEL PLATE

[75] Inventor: Hilary E. W. Davies, Stockholm, Sweden

[73] Assignee: LKB-Produkter AB, Bromma, Sweden

[22] Filed: Apr. 11, 1974

[21] Appl. No.: 460,038

[30] Foreign Application Priority Data
Apr. 13, 1972 Sweden.................. 73053332/72

[52] U.S. Cl............................. 204/299, 204/180 G
[51] Int. Cl............................................. B01k 5/00
[58] Field of Search ............ 204/299, 180 G, 180 S, 204/180 R

[56] References Cited
UNITED STATES PATENTS

| | | | |
|---|---|---|---|
| 3,360,454 | 12/1967 | Sahmel .............................. | 204/299 |
| 3,616,457 | 10/1971 | Hjerten et al...................... | 204/299 |
| 3,762,877 | 10/1973 | Rains et al....................... | 204/299 X |

Primary Examiner—Howard S. Williams
Assistant Examiner—A. C. Prescott

[57] ABSTRACT

The present invention relates to an electrode arrangement for an electrophoretical separation performed in a gel plate. A multiple simultaneous electrophoretical separations it is suitable that these are performed in one and the same electrical field, i.e., with equal voltage and equal electrode distance. This is accomplished by a single elongated anode and a single elongated cathode. It is essential that the two electrodes are completely parallel, especially if the various samples, separated side by side, are to be directly compared after completed separation. When utilization of a gel electrophoresis apparatus for routine analytical purposes, as in clinical analysis, where it is desired to perform a great number of runs in series, the changing of gel plate tends to be time-consuming. The present invention accordingly relates to an electrode arrangement whereby the two electrodes easily can be removed from the gel plate for changing of this one, and thereafter again easily be applied in exact parallel. The present invention is also related to an electrode arrangement providing for free diversion from the electrode of gaseous electrode reaction products, with maintained simultaneous good contact between electrode and gel plate or electrolyte impregnated strip lying on the gel. The electrode arrangement according to this invention also permits that the lid is situated close to the gel plate, which facilitates the maintenance of a favourable humidity in the atmosphere above the plate. The invention is characterized in a mainly rectangular plate, parallel to the gel plate, said plate on its side facing the gel plate exhibiting two parallel rows of toothed elevations and two electrodes, extending one along each row, said electrodes consisting of threads of an inert, conducting material.

4 Claims, 4 Drawing Figures

ELECTRODE ARRANGEMENT FOR AN ELECTROPHORETICAL SEPARATION PERFORMED IN A GEL PLATE

The present invention relates to an electrode arrangement for an electrophoretical separation performed in a gel plate.

Electrophoretical separations, such as zone electrophoresis and isoelectric focusing, can be carried out in a gel, impregnated by suitable buffer solutions, the gel consisting of, for example, agar or polyacryl amide. The gel can be designed as a plate, which is especially suitable when several samples simultaneously should be subject to separation. At multiple simultaneous separations it is suitable that these are performed in one and the same electrical field, i.e. with equal voltage and equal electrode distance. Practically, this is most easily accomplished by a single elongated anode and a single elongated cathode, which together are generating an electrical field over all or a great part of the width of the plate. It is then essential that the two electrodes are completely parallel, especially if various samples, separated side by side, shall be directly compared after completed separation. Generally utilized such electrodes are rods of graphite or another inert, conducting material, which are applied directly on the gel or onto strips, consisting of a porous material such as filter paper, which are impregnated with a suitable electrode buffer solution and are laid on the gel.

Thus, great care is required to apply prior to a separation the electrodes completely in parallel. If applying of the electrodes is carried out all manually, this operation will be time-consuming. This is disadvantageous, especially at utilization of a gel electrophoresis apparatus for routine analytical purposes, as in clinical analysis, where it is desired to perform a great number of runs in series, as the electrodes have to be removed from the gel after each separation for changing of the gel plate.

The electrodes can of course be provided with some guiding means which will guarantee a parallel positioning of the electrodes every time these are applied onto the gel. The electrodes can, for instance, be made tiltable around their respective one end, which however will require much space and which also is unsatisfactory from safety aspects.

When performing an electrophoretical experiment it is suitable to cover gel plate and electrodes by a lid. A purpose of this lid is the mechanical protection of the gel plate and the electrodes. As the gel plate usually is cooled, there is also a risk of condensation of air humidity on the gel if this is not provided with a lid. Generally, it is desirable to maintain a constant humidity in the atmosphere above the gel, and it is therefore also a purpose of the lid to maintain a small volume of air essentially stationary above the gel plate. From this point of view it is advantageous that this volume of air is small, i.e., that the lid is close to the gel. The lid does not have to be closed tightly. The mentioned electrodes, consisting of rods of e.g. graphite, are also fairly space-consuming in applied position, and therefore the lid will be situated at quite a distance above the gel plate.

At changing of the gel plate after completed electrophoretical separation the lid has first to be removed, after which the electrodes are taken aside by means of the guiding means, whereafter the gel plate can be changed.

At the electrode forming anode there is evolved oxygen as an electrode reaction product, while at the cathode hydrogen will be evolved.

It is important that a good contact is maintained between the electrode and the gel plate or the electrolyte impregnated strip lying on the gel, respectively. When an electrode consisting of a graphite rod is pressed against the gel or against an electrolyte impregnated strip lying on the gel, respectively, in order to obtain good electrical contact, the contact surface however will be so large that a certain retention of evolved gas will be caused, which will disturb the electrode reaction and accordingly the electrophoresis as such. If, on the contrary, the electrode consists of a thin thread of some inert material, for instance, platina, the gaseous electrode reaction products can be freely diverted. Even if the thread is kept strained between its points of attachments it is however difficult to achieve a sufficient contact between the electrode and its bed.

The present invention accordingly relates to an electrode arrangement for electrophoretical separation in a gel, whereby the two electrodes easily can be removed from the gel plate for changing of this one, and thereafter again easily be applied in exact parallel. The present invention is also related towards an electrode arrangement providing for free diversion from the electrode of gaseous electrode reaction products, with maintained simultaneous good contact between electrode and gel plate or electrolyte impregnated strip lying on the gel.

Accordingly, the electrode device comprises a plate, utilized at the electrophoresis as a lid. The lid exhibits on the side which is turned towards the gel, parallel rows of toothed elevations. Along each of these rows an electrode is extending, consisting of a thread of an inert, conducting material. A suitable such material is platina, but other inert, conducting materials should not be regarded as falling outside the scope of the invention. By the toothed elevations the thread is pressed against the gel or against a strip lying on the gel, in order that good electrical contact is obtained at the same time as complete gas diversion is achieved by the toothing.

With the electrode arrangement according to the invention also changing of gel plate between two electrophoresis experiments is facilitated in that way that the lid is lifted off and the electrodes are removed in one and the same work operation and that the electrodes then retain their parallel orientation in the lid.

The electrode arrangement according to the invention also permits that the lid is situated close to the gel plate, which facilitates the maintenance of a favourable humidity in the atmosphere above the plate.

The characteristics of the invention are obvious from the claims, following the specification.

Figure 2:
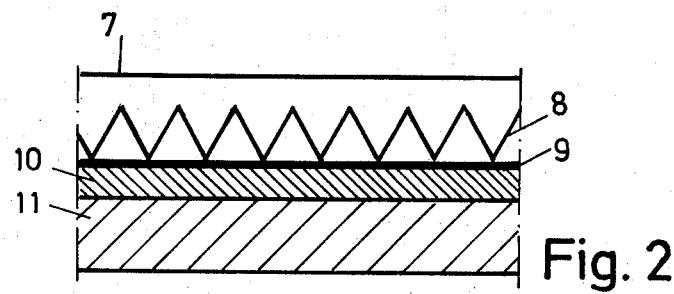
Figure 3:
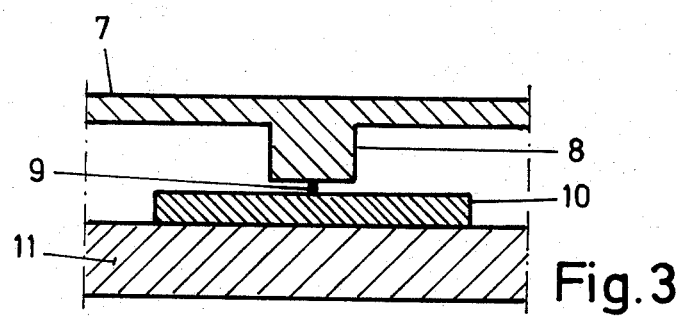
Figure 4:
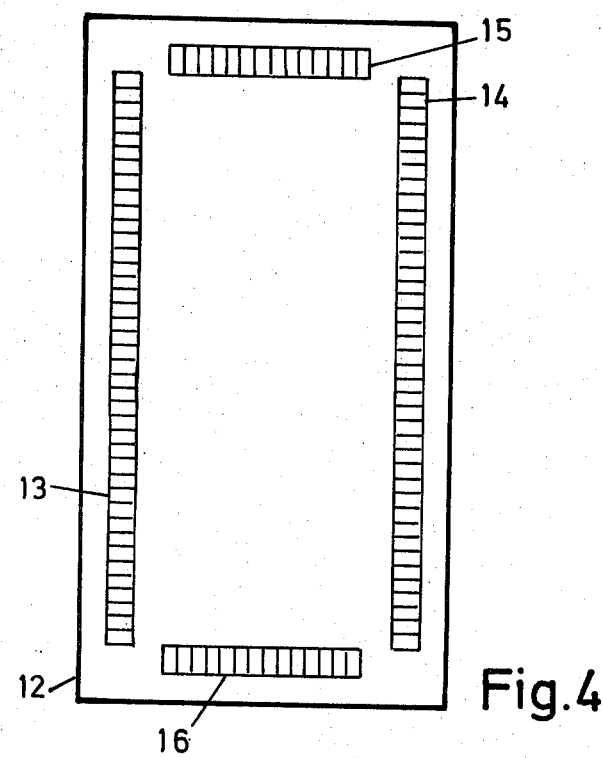

The invention will now be further specified with reference to the attached drawing on which FIG. 1 shows a view of an embodiment of the electrode arrangement according to the invention, FIG. 2 shows a section of a side view of the arrangement according to the invention, FIG. 3 shows a section of the object of FIG. 2, FIG. 4 shows an alternative embodiment of the electrode arrangement according to the invention.

In FIG. 1 is denoted by 1 a plate, viewed from that side which is intended to be facing the gel utilized at separation. 2 and 3 denote two parallel rows of toothed elevations. By 4 is denoted a platina wire, making one electrode, which is stretched along the toothed elevations between a first attachment 5 and a second attachment 6, the latter one also forming connecting means for the electrode.

In FIGS. 2 and 3 is denoted by 7 a plate, provided with rows of toothed elevations, represented by 8, which press a platina wire 9, making one electrode against a strip of filter paper 10, impregnated with electrode buffer and lying on a gel 11.

In FIG. 4 is denoted by 12 a plate, viewed from that side which is intended to face the gel, utilized at separation. 13 and 14 denote parallel rows of toothed elevations, while 15 and 16 denote further rows of toothed elevations which are mutually parallel.

The plate (1, 7, 12) comprised within the electrode arrangement according to the invention thus forms the lid covering the gel plate during the separation. As those threads of inert, conducting material, for instance platina, making electrodes, are affixed in this plate, rapidness in operation at changing of gel plate between two separation experiments is gained. At the same time the parallelity of the electrodes is retained. The toothed elevations suitably have the approximate design of triangular prisms, as is obvious from FIGS. 2 and 3. In that way the thread shaped electrode is pressed against the base of the edges of the prisms, while between the prisms there is sufficient space at hand for gas diversion. It is not critical for the invention that the prisms are sharply pointed. The edges of the prisms can also be chamfered or bevelled. Toothed elevations having rectangular section are conceivable but this will entail a somewhat inferior gas diversion without causing improved contact between electrode and base. Toothings having approximately triangular section are also preferable from manufacturing point of view.

FIG. 1 shows a plate provided with two prallel rows of toothed elevations. By means of the electrodes applied at these rows a separation of sample components is performed in a direction perpendicular to the rows. Of course, the plate can be provided with an arbitrary number of electrodes parallel in pairs. With rows arranged as shown in FIG. 4 on an oblong plate, electrodes can alternatively be applied for separation of a greater number of samples along a certain migration distance or of a smaller number of samples along a longer migration distance.

I claim:

1. Electrode arrangement for an electrophoretical separation performed in a gel plate, characterized in that it comprises a mainly rectangular plate, parallel to said gel plate, which plate on its side facing the gel plate exhibits two parallel rows of toothed elevations and two electrodes, extending one along each row, said electrodes, consisting of threads of an inert, conducting material, and wherein each electrode is pressed against the gel or against a strip, consisting of a porous material and impregnated by buffer solution and which is lying on the gel, by the toothed elevations.

2. Electrode arrangement according to claim 1, characterized in that said plate on its side facing the gel plate exhibits rows of toothed elevations, said rows being arranged parallel in pairs, and exhibiting two electrodes, extending along two parallel rows, said electrodes consisting of threads of an inert, conducting material, wherein each electrode is pressed by the toothed elevations against the gel or against a strip, consisting of a porous material and impregnated with a buffer solution and which is lying on the gel.

3. Electrode arrangment according to claim 1, characterized in that said electrodes are made of platina threads.

4. Electrode arrangement according to claim 2, characterized in that said electrodes are made of platina threads.

* * * * *